US012646969B2

(12) United States Patent
Watanabe et al.

(10) Patent No.: US 12,646,969 B2
(45) Date of Patent: Jun. 2, 2026

(54) ACTIVE STYLUS, ELECTRONIC DEVICE, AND WIRELESS POWER SUPPLY SYSTEM

(71) Applicant: Wacom Co., Ltd., Saitama (JP)

(72) Inventors: Naoki Watanabe, Saitama (JP);
Masayuki Miyamoto, Saitama (JP);
Haruhiko Hisano, Saitama (JP)

(73) Assignee: Wacom Co., Ltd., Saitama (JP)

( * ) Notice: Subject to any disclaimer, the term of this patent is extended or adjusted under 35 U.S.C. 154(b) by 980 days.

(21) Appl. No.: 17/553,384

(22) Filed: Dec. 16, 2021

(65) Prior Publication Data

US 2022/0200337 A1     Jun. 23, 2022

(30) Foreign Application Priority Data

Dec. 23, 2020     (JP) ................................. 2020-213712

(51) Int. Cl.
| | |
|---|---|
| *H02J 50/00* | (2016.01) |
| *G06F 3/0354* | (2013.01) |
| *G06F 3/044* | (2006.01) |
| *H02J 7/70* | (2026.01) |
| *H04W 72/21* | (2023.01) |
| *H04W 72/23* | (2023.01) |

(52) U.S. Cl.
CPC .......... *H02J 50/00* (2016.02); *G06F 3/03545* (2013.01); *G06F 3/0441* (2019.05); *H02J 7/731* (2026.01); *H04W 72/21* (2023.01); *H04W 72/23* (2023.01)

(58) Field of Classification Search
USPC ........................................................ 320/108
See application file for complete search history.

(56) References Cited

U.S. PATENT DOCUMENTS

| | | | |
|---|---|---|---|
| 10,627,923 B2 | 4/2020 | Ruscher | |
| 10,739,871 B2 | 8/2020 | Jiang et al. | |
| 2019/0198212 A1 | 6/2019 | Levy | |
| 2020/0403456 A1* | 12/2020 | Louis | ...................... H02J 50/10 |

FOREIGN PATENT DOCUMENTS

| | | |
|---|---|---|
| JP | 2011097770 A | 5/2011 |
| WO | 2016/139861 A1 | 9/2016 |
| WO | 2017/029836 A1 | 2/2017 |
| WO | 2020060580 A1 | 3/2020 |

* cited by examiner

*Primary Examiner* — Bryce M Aisaka
(74) *Attorney, Agent, or Firm* — Seed Intellectual Property Law Group LLP

(57)     ABSTRACT
Disclosed herein is an active stylus that transmits and receives signals to and from an electronic device, the active stylus including a receiver which, in operation, receives an uplink signal transmitted from the electronic device, a transmitter which, in operation, transmits a downlink signal to the electronic device, a power receiver which, in operation, receives power wirelessly supplied from the electronic device, and an integrated circuit. When the power is not being supplied to the power receiver, the integrated circuit causes the transmitter to transmit the downlink signal in response to the receiver receiving the uplink signal. The integrated circuit stops transmission of the downlink signal by the transmitter in response to detecting that supply of the power supply to the power receiver has started.

6 Claims, 7 Drawing Sheets

F I G . 1
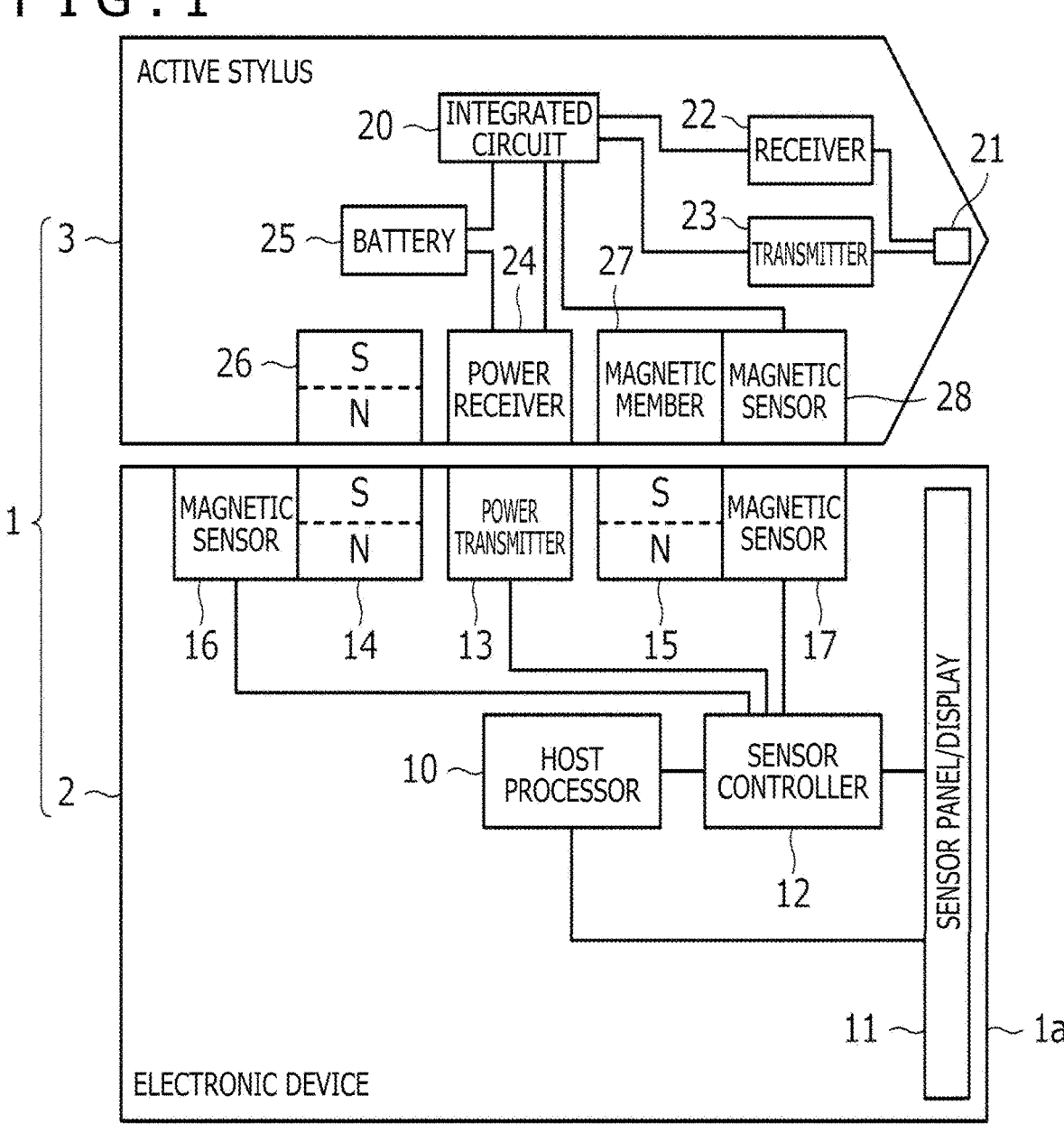

F I G . 2
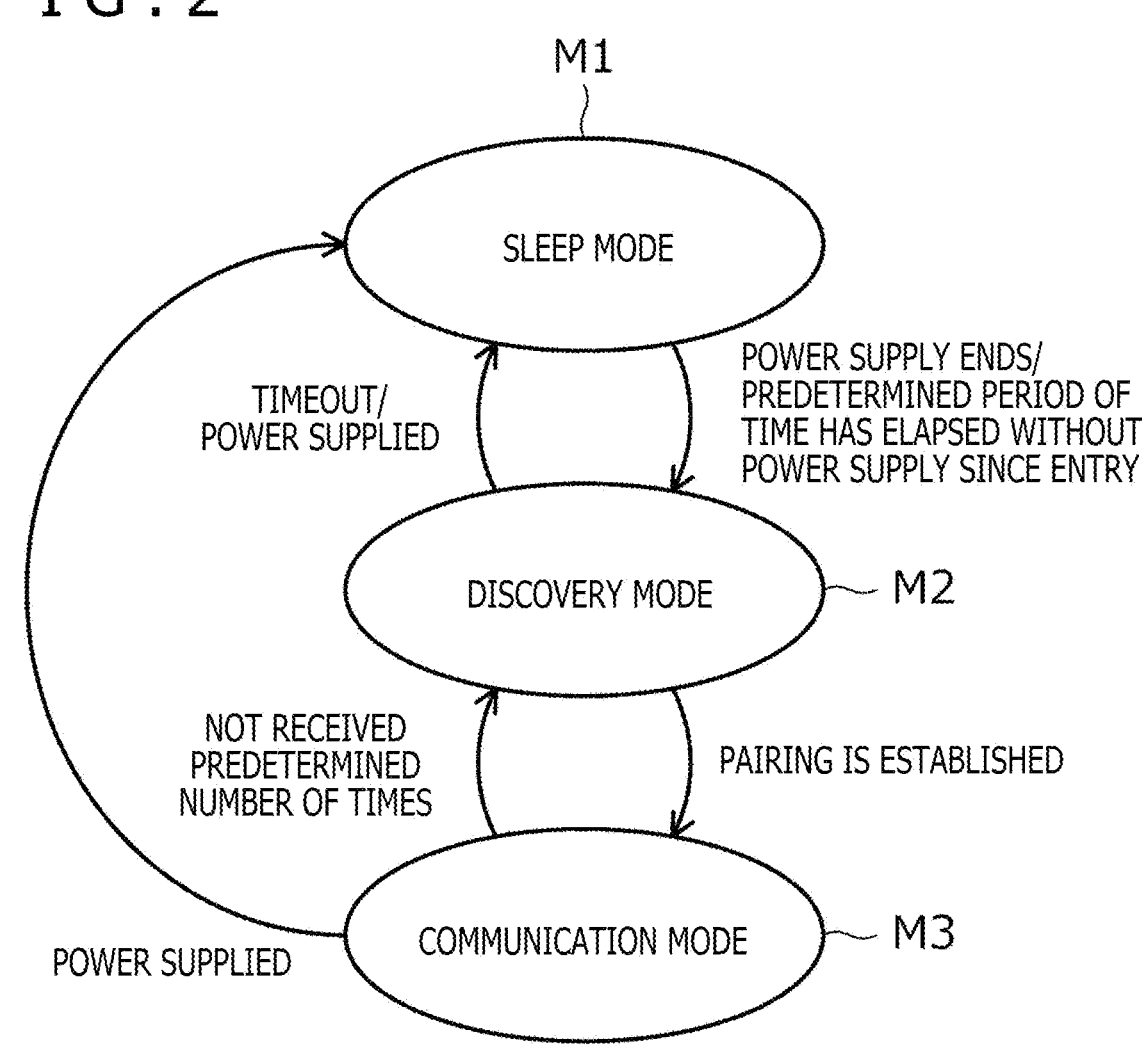

FIG.3

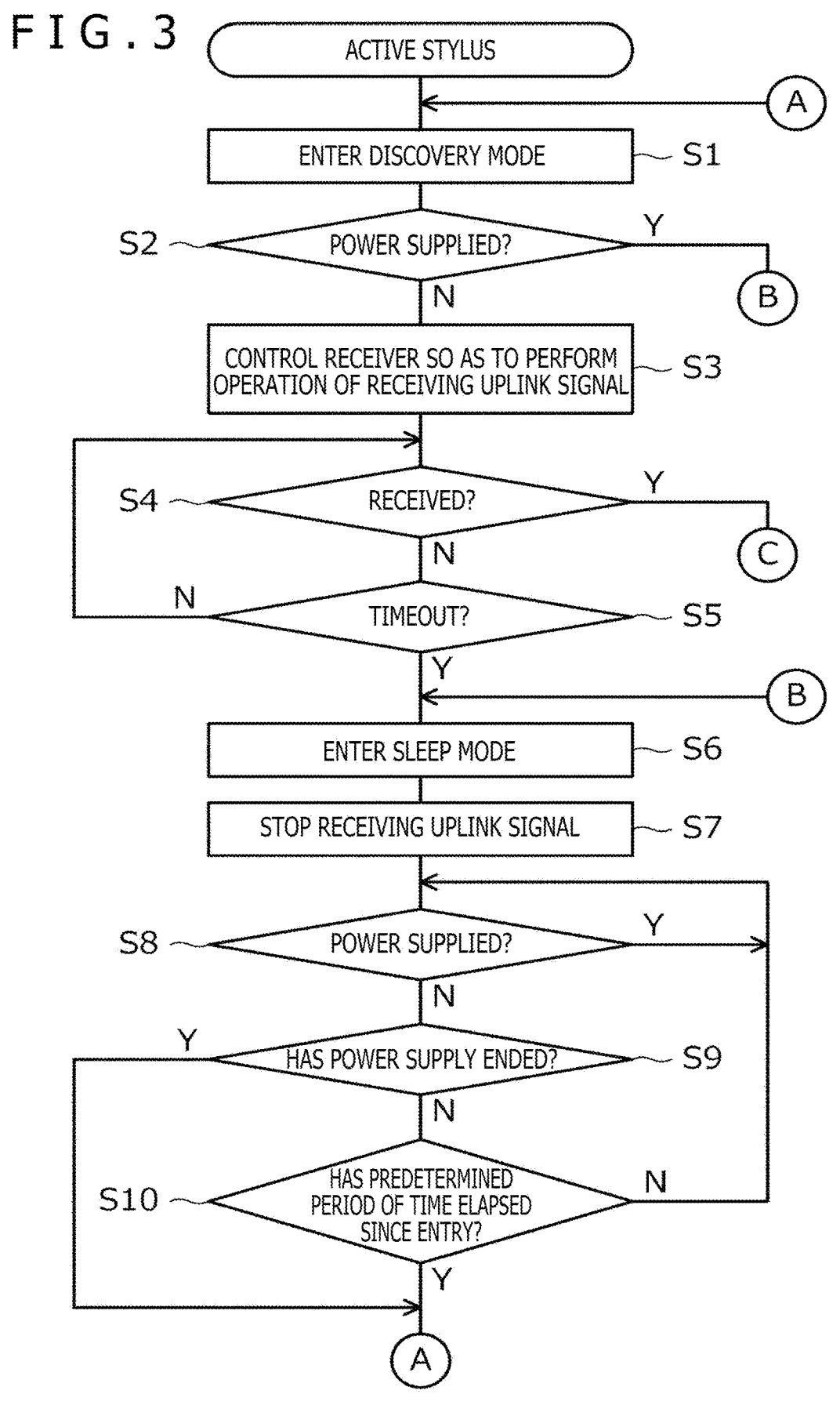

ACTIVE STYLUS (A)

ENTER DISCOVERY MODE — S1

S2 — POWER SUPPLIED? — Y → (B)

N

CONTROL RECEIVER SO AS TO PERFORM OPERATION OF RECEIVING UPLINK SIGNAL — S3

S4 — RECEIVED? — Y → (C)

N

N — TIMEOUT? — S5

Y (B)

ENTER SLEEP MODE — S6

STOP RECEIVING UPLINK SIGNAL — S7

S8 — POWER SUPPLIED? — Y

N

Y — HAS POWER SUPPLY ENDED? — S9

N

S10 — HAS PREDETERMINED PERIOD OF TIME ELAPSED SINCE ENTRY? — N

Y (A)

F I G . 5
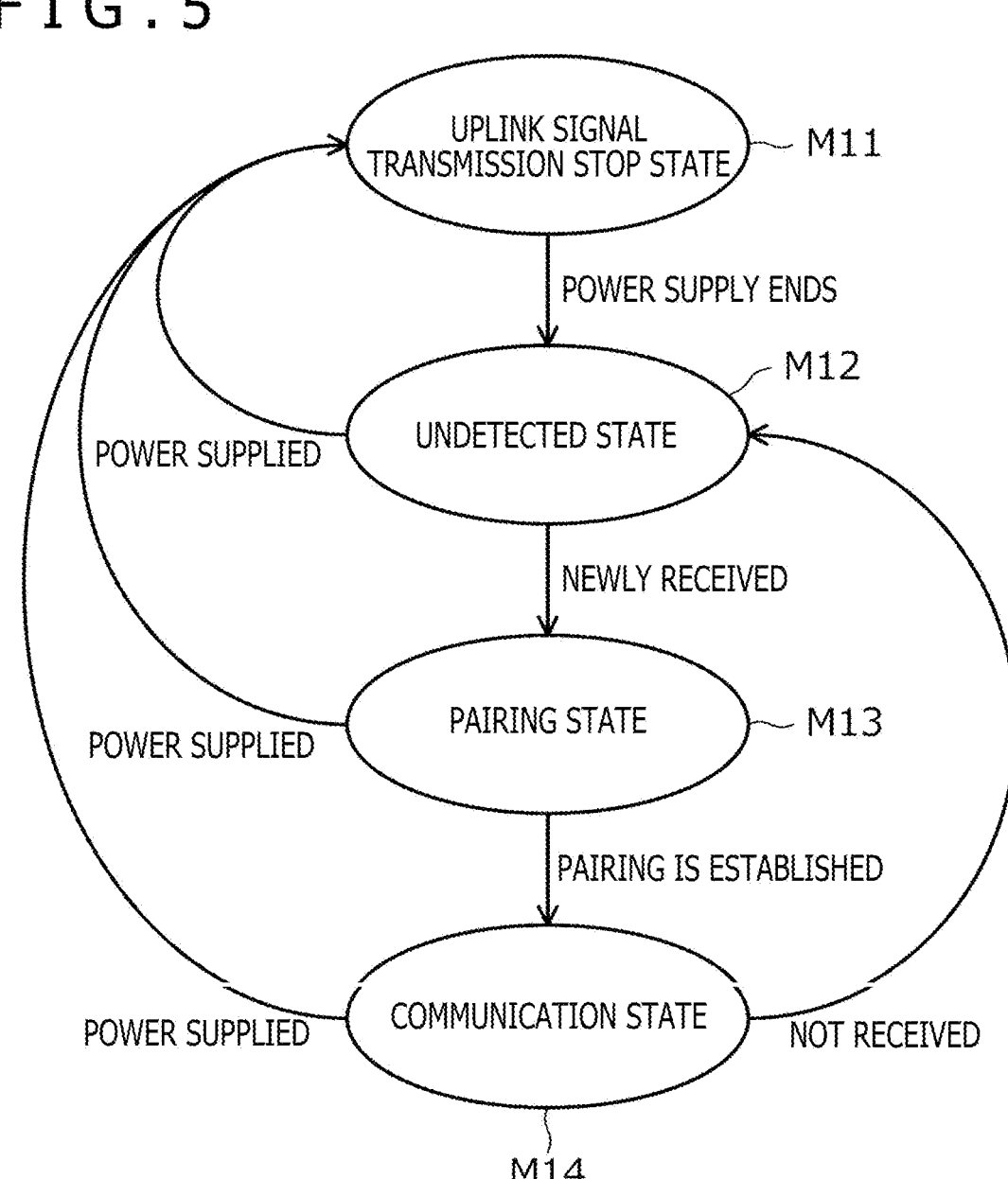

F I G . 6
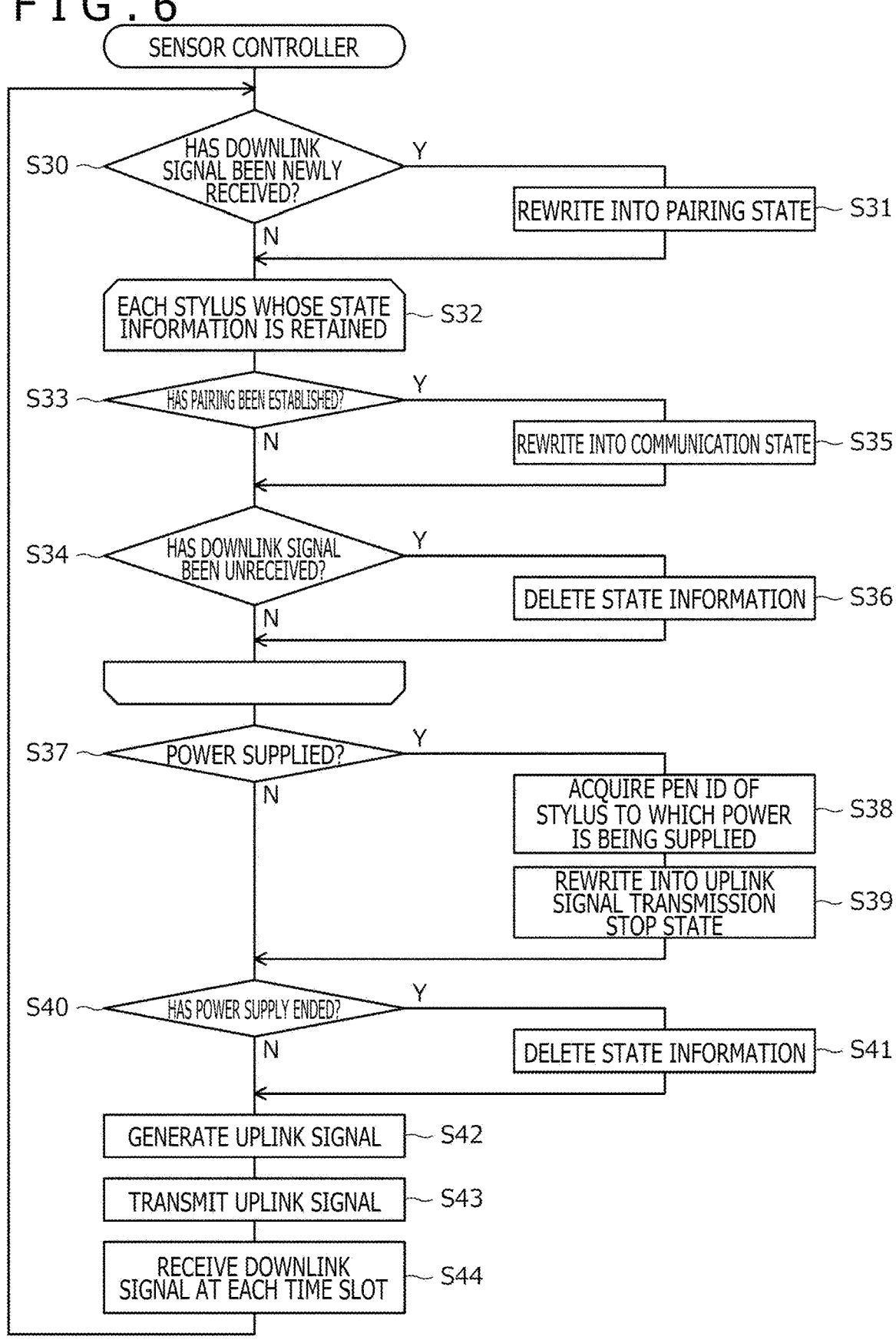

F I G . 7
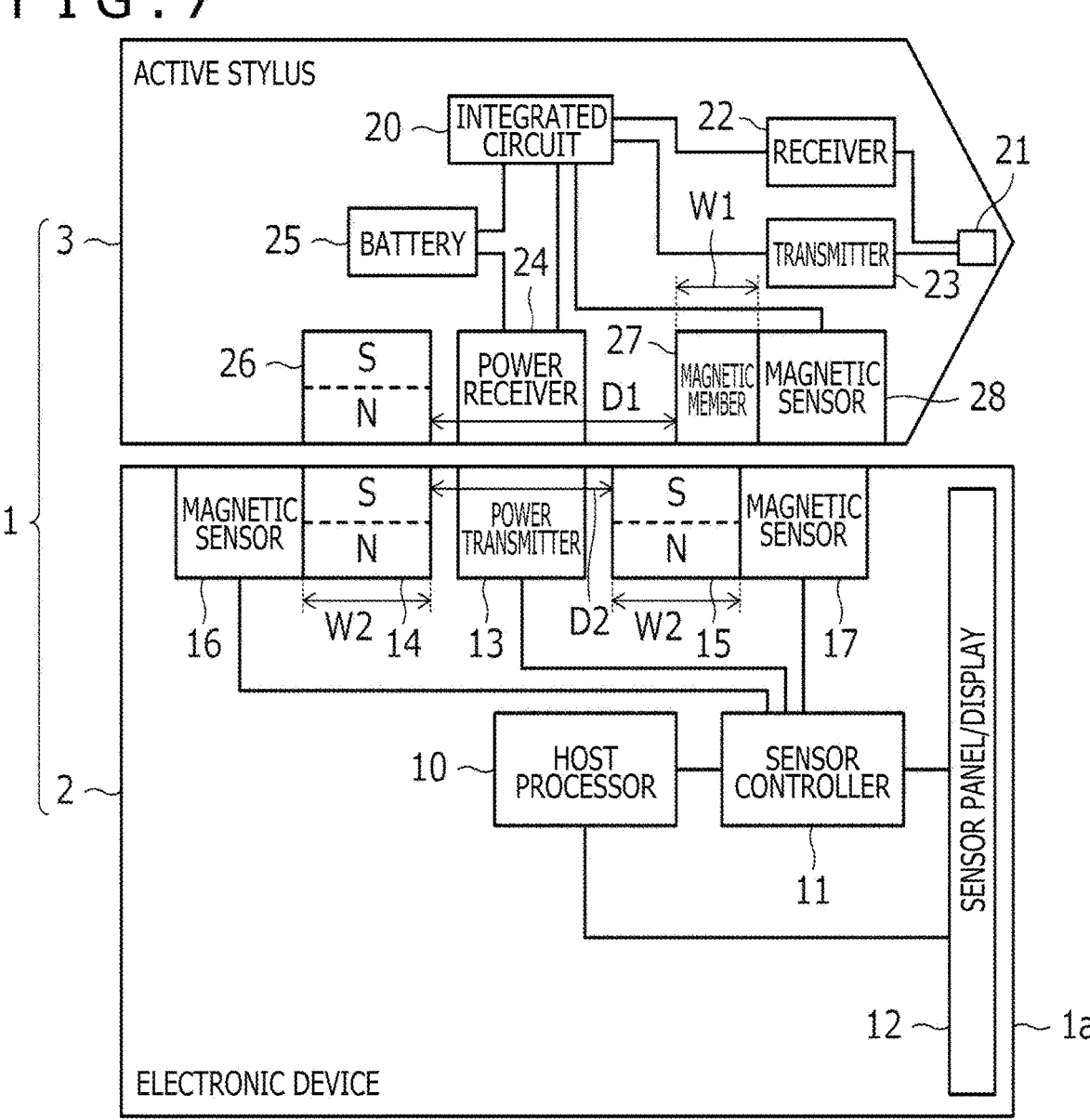

ACTIVE STYLUS, ELECTRONIC DEVICE, AND WIRELESS POWER SUPPLY SYSTEM

BACKGROUND

Technical Field

The present disclosure relates to an active stylus, an electronic device, and a wireless power supply system.

Background Art

Some styluses used for pen input into electronic devices such as tablet terminals have a built-in battery. In recent years, attention has been paid to a technique for charging such a battery by receiving power wirelessly supplied from an electronic device. Examples of this kind of technique are disclosed in U.S. Pat. Nos. 10,627,923 and 10,739,871.

An active stylus that bidirectionally transmits and receives a signal to and from an electronic device is also known. Examples of the active stylus are disclosed in PCT Patent Publication No. WO 2016/139861 and PCT Patent Publication No. WO 2017/029836. In the following description, a signal transmitted from an electronic device to an active stylus will be referred to as an "uplink signal," while a signal transmitted from the active stylus to the electronic device will be referred to as a "downlink signal."

BRIEF SUMMARY

In order to charge a battery built in an active stylus by receiving power wirelessly supplied from an electronic device, the active stylus needs to be placed in the vicinity of the electronic device. However, this may cause the active stylus to receive an uplink signal and establish pairing with the electronic device, even though the active stylus is not in use. The active stylus and the electronic device that are paired continuously transmit and receive uplink and downlink signals. Since this results in unnecessary power consumption, there has been a need for improvement.

Therefore, it is an object of the present disclosure to provide an active stylus, an electronic device, and a wireless power supply system that can suppress power consumption when a battery built in the active stylus is being charged by receiving power wirelessly supplied from the electronic device.

According to U.S. Pat. No. 10,627,923, magnets are disposed on both sides of a power transmitter disposed in the electronic device, while magnets are also disposed on both sides of a power receiver disposed in a stylus. With the magnets of the electronic device and the magnets of the stylus attracted to each other, the stylus receiving wireless power supply is fixed to the electronic device. However, in conventional electronic devices and styluses, these magnets are each disposed such that the magnetization direction is parallel to the pen axis direction (that is, these magnets are each disposed in the orientation in which the N and S poles are aligned along the pen axis direction). Since this configuration limits the orientation of the stylus when the stylus is fixed to the electronic device to one orientation, there has been a need for improvement.

Therefore, it is another object of the present disclosure to provide an active stylus, an electronic device, and a wireless power supply system with a high degree of freedom in the orientation of the active stylus when the active stylus is fixed to the electronic device.

An active stylus according to a first aspect of the present disclosure is an active stylus that transmits and receives signals to and from an electronic device and includes a receiver which, in operation, receives an uplink signal transmitted from the electronic device, a transmitter which, in operation, transmits a downlink signal to the electronic device, a power receiver which, in operation, receives power wirelessly supplied from the electronic device, and an integrated circuit. When the power is not being supplied to the power receiver, the integrated circuit causes the transmitter to transmit the downlink signal in response to the receiver receiving the uplink signal. The integrated circuit stops transmission of the downlink signal by the transmitter in response to determining that supply of the power to the power receiver has started.

An electronic device according to the first aspect of the present disclosure is an electronic device that derives a position of an active stylus and includes a power transmitter which, in operation, wirelessly supplies power to the active stylus, and a sensor controller which, in operation, derives the position of the active stylus on a touch surface by using a sensor panel. The sensor controller, in operation, transmits an uplink signal via the sensor panel, detects, via the sensor panel, a downlink signal that the active stylus has transmitted in response to receiving the uplink signal, and stops transmitting the uplink signal to the active stylus in response to detecting that the power transmitter has shifted to a state of wirelessly supplying the power to the active stylus.

A wireless power supply system according to a second aspect of the present disclosure is a wireless power supply system including an active stylus, and an electronic device which, in operation, derives a position of the active stylus. The active stylus includes: a first magnet having a first magnetic pole and a second magnetic pole, a power receiver which, in operation, receives power wirelessly supplied from the electronic device, and a magnetic member. The electronic device includes: a second magnet having the second magnetic pole and the first magnetic pole, a power transmitter which, in operation, wirelessly supplies the power to the active stylus, and a third magnet having the first magnetic pole and the second magnetic pole. The first magnet, the power receiver, and the magnetic member are disposed on a side surface of the active stylus in an order of the first magnet, the power receiver, and the magnetic member along a direction of a pen axis. The first magnet is disposed such that the first magnetic pole and the second magnetic pole are aligned in a radial direction of the active stylus. The second magnet, the power transmitter, and the third magnet are disposed side by side on a surface of the electronic device in an order the second magnet, the power transmitter, and the third magnet. Each of the second magnet and the third magnet is disposed such that the first magnetic pole and the second magnetic pole are aligned in a depth direction of the electronic device.

An active stylus according to the second aspect of the present disclosure is an active stylus that indicates a position on a touch surface by transmitting and receiving signals to and from an electronic device and includes a first magnet having a first magnetic pole and a second magnetic pole, a power receiver which, in operation, receives power wirelessly supplied from the electronic device, and a magnetic member. The first magnet, the power receiver, and the magnetic member are disposed on a side surface of the active stylus in an order of the first magnet, the power receiver, and the magnetic member along a direction of a pen axis. The first magnet is disposed such that the first magnetic pole and the second magnetic pole are aligned in a radial direction of the active stylus.

An electronic device according to the second aspect of the present disclosure is an electronic device that derives a position of an active stylus and includes a first magnet having a first magnetic pole and a second magnetic pole, a power transmitter which, in operation, wirelessly supplies power to the active stylus, and a second magnet having the first magnetic pole and the second magnetic pole. The first magnet, the power transmitter, and the second magnet are disposed side by side on a surface of the electronic device in an order of the first magnet, the power transmitter, and the second magnet. Each of the first magnet and the second magnet is disposed such that the first magnetic pole and the second magnetic pole are aligned in a depth direction of the electronic device.

According to the first aspect of the present disclosure, the transmission of the downlink signal from the active stylus or the transmission of the uplink signal from the sensor controller to the active stylus stops in response to the start of the wireless power supply from the electronic device to the active stylus. This configuration can suppress power consumption when a battery built in the active stylus is being charged by receiving power wirelessly supplied from the electronic device.

According to the second aspect of the present disclosure, the active stylus can be fixed to the electronic device in an orientation in which the first magnet and the second magnet are attracted to each other and the magnetic member and the third magnet are attracted to each other. Alternatively, the active stylus can be fixed to the electronic device in an orientation in which the first magnet and the third magnet are attracted to each other and the magnetic member and the second magnet are attracted to each other. This configuration can provide the wireless power supply system with a high degree of freedom in the orientation of the active stylus when the active stylus is fixed to the electronic device.

BRIEF DESCRIPTION OF THE SEVERAL VIEW OF THE DRAWINGS

FIG. 1 is a diagram illustrating a system configuration of a wireless power supply system according to an embodiment of the present disclosure;

FIG. 2 is a diagram illustrating operation modes of an integrated circuit;

FIG. 3 is a flowchart illustrating a processing flow of the integrated circuit;

FIG. 5 is a diagram illustrating each state of an individual active stylus retained by a sensor controller;

FIG. 6 is a flowchart illustrating a processing flow of the sensor controller; and FIG. 7 is a diagram illustrating a system configuration of the wireless power supply system according to a modification of the embodiment of the present disclosure.

DETAILED DESCRIPTION

Figure 4:
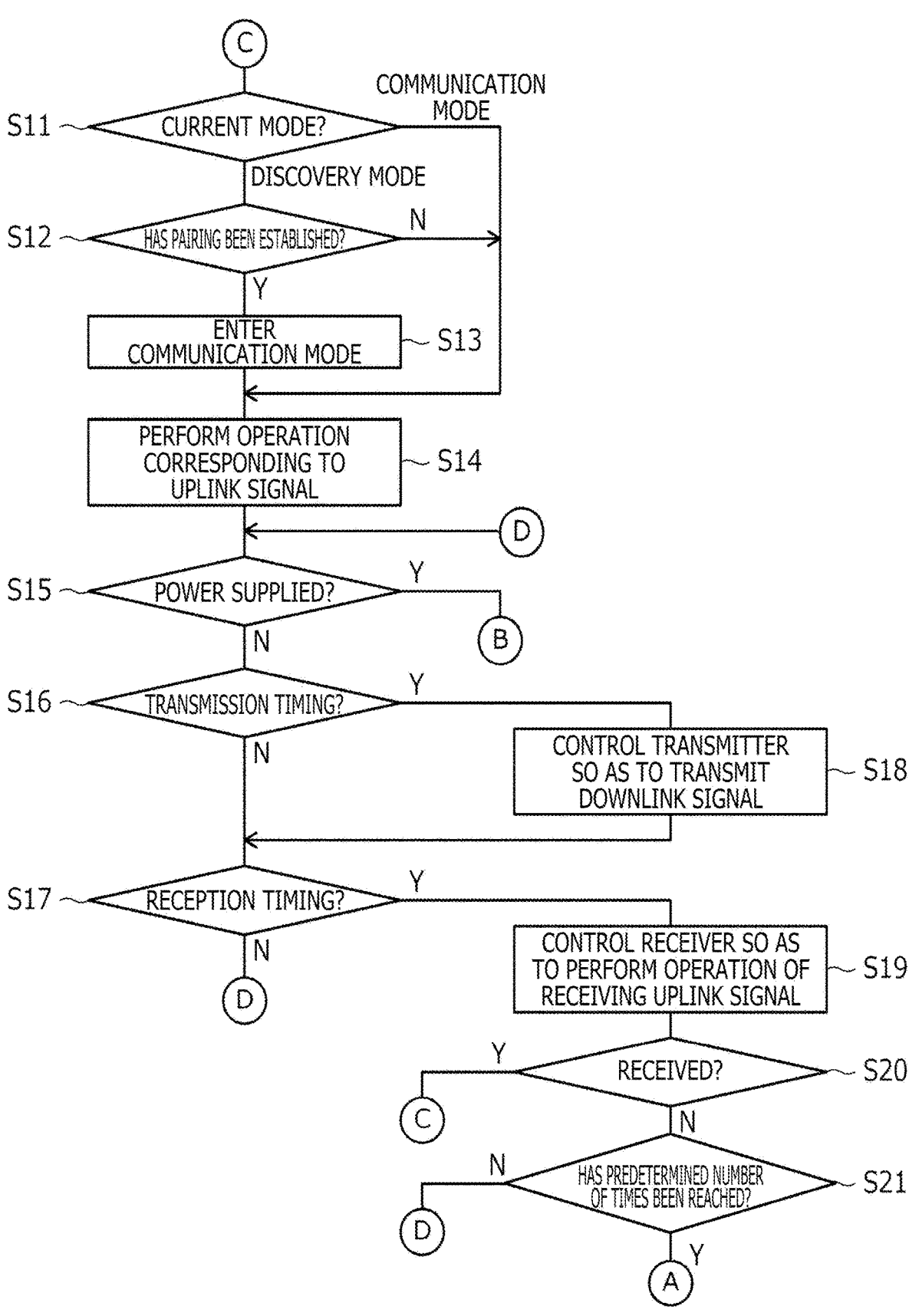
FIG. 4 is a flowchart illustrating the processing flow of the integrated circuit.

Hereinafter, an embodiment of the present disclosure will be described in detail with reference to the accompanying drawings.

FIG. 1 is a diagram illustrating a system configuration of a wireless power supply system 1 according to an embodiment of the present disclosure. As illustrated in FIG. 1, the wireless power supply system 1 includes an electronic device 2 and an active stylus 3.

The electronic device 2 is a position detection device that derives a position of the active stylus 3 on a touch surface 1a. For example, a tablet terminal or a personal computer that uses its display surface as the touch surface 1a may be used as the electronic device 2. A digitizer or the like that does not use its display surface as the touch surface 1a may also be used as the electronic device 2. In the following description, the electronic device 2 is assumed to be a tablet terminal.

As illustrated in FIG. 1, the electronic device 2 includes a host processor 10, a sensor panel/display 11, a sensor controller 12, a power transmitter 13, magnets 14 and 15, and magnetic sensors 16 and 17.

The host processor 10 is a central processing unit of the electronic device 2 and has functions of reading programs from a memory, not illustrated, and executing the programs. The programs executed by the host processor 10 include, for example, an operating system of the electronic device 2 and various applications including a drawing application.

The sensor panel/display 11 is a device including a plurality of sensor electrodes disposed inside the touch surface 1a and a display including a plurality of pixels. The touch surface 1a also serves as a display surface of the display. The plurality of sensor electrodes are electrical conductors for performing communication between the sensor controller 12 and the active stylus 3 and are disposed throughout the touch surface 1a. The plurality of pixels included in the display are configured such that brightness can be controlled according to a change in magnitude of a voltage applied to both ends. The host processor 10 displays various types of images on the touch surface 1a (display surface) by individually controlling the brightness of each of the plurality of pixels. The plurality of sensor electrodes may also be used as part of electrodes inside the display (e.g., common electrodes of a liquid crystal display), in which case the electronic device 2 is called an "in-cell type."

The sensor controller 12 is an integrated circuit that derives the position of the active stylus 3 on the touch surface 1a and receives data transmitted from the active stylus 3 by bidirectionally communicating with the active stylus 3 via the plurality of sensor electrodes inside the sensor panel/display 11. The communication between the sensor controller 12 and the active stylus 3 is performed using, for example, an active capacitive method or an electromagnetic induction method.

An uplink signal transmitted from the sensor controller 12 to the active stylus 3 serves to notify the active stylus 3 of an uplink and downlink signal transmission/reception schedule and also transmit a command to the active stylus 3. The active stylus 3 acquires the uplink and downlink signal transmission/reception schedule based on a reception timing of the received uplink signal and also performs a process of generating a downlink signal based on the command included in the received uplink signal.

The downlink signal includes a position signal and a data signal. The position signal is used by the sensor controller 12 to derive the position of the active stylus 3. The data signal is a signal modulated by data requested by the command. The sensor controller 12 attempts to receive the position signal at each of the plurality of sensor electrodes inside the sensor panel/display 11 and derives the position of the active stylus 3 on the touch surface 1a based on a reception strength of the position signal at each sensor electrode. The sensor controller 12 also acquires data transmitted from the active stylus 3 by receiving the data signal using any one of the plurality of sensor electrodes inside the sensor panel/ display 11. The data acquired in this manner includes a pen identifier (ID), a writing pressure value, switch information, and the like. The pen ID is assigned to the active stylus 3 in advance. The writing pressure value indicates a pressure applied to a pen tip of the active stylus 3. The switch information indicates on/off of a switch disposed on a surface of the active stylus 3. The sensor controller 12 sequentially supplies the derived position and the received data to the host processor 10. The host processor 10 performs processes of generating and rendering stroke data based on the position and data supplied in this manner and displaying the stroke data on the sensor panel/display 11 and also generating a digital ink including the generated stroke data.

The power transmitter 13 is a functional unit that wirelessly supplies power to the active stylus 3. Although not illustrated, the power required for the operation of the power transmitter 13 is supplied from a battery or a commercial power source that functions as an operating power source of the electronic device 2.

In a typical example, the power transmitter 13 performs wireless power supply in accordance with "Qi," which is an international standard for wireless charging. In this case, the power transmitter 13 has a built-in power transmission coil. By causing alternating current to flow through the power transmission coil, the power transmitter 13 magnetically couples to a power receiving coil included in a power receiver 24 to be described later, thereby transmitting power to the power receiver 24. Further, the power transmitter 13 can bidirectionally communicate with the power receiver 24. Specifically, signal transmission from the power transmitter 13 to the power receiver 24 is performed by modulating an operating frequency of the power transmitter 13 (frequency shift keying), and signal transmission from the power receiver 24 to the power transmitter 13 is performed by modulating a reflected impedance of the power receiver 24 (amplitude shift keying). The power transmitter 13 performs wireless power supply when the power transmitter 13 detects presence of the power receiver 24 through this communication, and ends the wireless power supply in response to receiving, from the power receiver 24, a signal indicating an end of the wireless power supply.

Each of the magnets 14 and 15 is a permanent magnet having a first magnetic pole and a second magnetic pole. One of the first and second magnetic poles is an S pole, and the other is an N pole. As illustrated in FIG. 1, each of the magnets 14 and 15 is disposed such that the first and second magnetic poles are aligned in a depth direction of the electronic device 2. Although the S poles of both of the magnets 14 and 15 are positioned closer to a surface of the electronic device 2 in FIG. 1, it suffices that the pole positioned closer to the surface is the same between the two magnets 14 and 15. For example, the N poles of both of the magnets 14 and 15 may be positioned closer to the surface. The magnet 14, the power transmitter 13, and the magnet 15 are disposed side by side on the surface of the electronic device 2 in this order. In other words, the power transmitter 13 is sandwiched between the magnets 14 and 15.

Each of the magnetic sensors 16 and 17 is a sensor that detects a magnetic field and includes, for example, a Hall sensor. The magnetic sensor 16 is disposed in the vicinity of the magnet 14, while the magnetic sensor 17 is disposed in the vicinity of the magnet 15. In the electronic device 2, the magnetic sensors 16 and 17 detect a magnetic field generated by a magnet 26 to be described later.

The active stylus 3 includes an integrated circuit 20, a pen-tip electrode 21, a receiver 22, a transmitter 23, the power receiver 24, a battery 25, the magnet 26, a magnetic member 27, and a magnetic sensor 28.

The integrated circuit 20 receives the uplink signal transmitted from the sensor controller 12 and transmits the downlink signal to the sensor controller 12 by bidirectionally communicating with the sensor controller 12 via the pen-tip electrode 21. The contents and roles of the uplink and downlink signals are as described above.

The pen-tip electrode 21 is an electrical conductor disposed on the pen tip of the active stylus 3. The receiver 22 is a reception circuit connected between the integrated circuit 20 and the pen-tip electrode 21 and receives the uplink signal arriving at the pen-tip electrode 21 and supplies the uplink signal to the integrated circuit 20. The transmitter 23 is a transmission circuit connected between the integrated circuit 20 and the pen-tip electrode 21. The transmitter 23 transmits the downlink signal from the pen-tip electrode 21 by supplying the downlink signal generated by the integrated circuit 20 to the pen-tip electrode 21.

The power receiver 24 is a functional unit that receives power wirelessly supplied from the power transmitter 13 of the electronic device 2. The specific method of the wireless power supply is as described above. Further, the power receiver 24 and the power transmitter 13 of the electronic device 2 can bidirectionally communicate with each other as described above. The power receiver 24 supplies the received power to the battery 25, thereby charging the battery 25. The battery 25 is a battery built in the electronic device 2 and functions as an operating power source of the integrated circuit 20.

As with the magnets 14 and 15 described above, the magnet 26 is a permanent magnet having a first magnetic pole and a second magnetic pole. As illustrated in FIG. 1, the magnet 26 is disposed such that the first and second magnetic poles are aligned in a radial direction of the active stylus 3. Which of the first and second magnetic poles is positioned closer to the surface of the active stylus 3 is determined depending on how the magnets 14 and 15 of the electronic device 2 are aligned. Specifically, how the first and second magnetic poles of the magnet 26 are aligned is determined such that the magnetic pole positioned closer to the surface of the active stylus 3 is different from the magnetic poles of the magnets 14 and 15 positioned closer to the surface of the electronic device 2.

The magnetic member 27 is a substance that is attracted to a magnet and typically includes a ferromagnet such as iron, cobalt, or nickel. As illustrated in FIG. 1, the magnet 26, the power receiver 24, and the magnetic member 27 are disposed side by side on a side surface of the active stylus 3 in this order along a pen axis direction. In other words, the power receiver 24 is sandwiched between the magnet 26 and the magnetic member 27. Although the magnetic member 27 is disposed on the pen tip side in FIG. 1, the magnet 26 may be disposed on the pen tip side.

The magnetic sensor 28 is a sensor that detects a magnetic field and includes, for example, a Hall sensor. The magnetic sensor 28 is disposed in the vicinity of the magnetic member 27 or the magnet 26. In the active stylus 3, the magnetic sensor 28 detects a magnetic field generated by the magnet 14 or 15 of the electronic device 2.

The basic configuration of the wireless power supply system 1 has been described above. Next, the operation of each of the integrated circuit 20 and the sensor controller 12 will be described in detail with reference to FIGS. 2 to 6.

FIG. 2 is a diagram illustrating operation modes of the integrated circuit 20. As illustrated in FIG. 2, the integrated circuit 20 operates in one of a sleep mode M1, a discovery mode M2, and a communication mode M3.

The operation mode of the integrated circuit 20 immediately after the start of the power supply from the battery 25 is the discovery mode M2. The integrated circuit 20 entering the discovery mode M2 monitors the reception of the uplink signal by the receiver 22 and also monitors the start of the power supply to the power receiver 24. As a result, when the state in which no uplink signal is received has continued for a predetermined period of time or when the power supply to the power receiver 24 starts, the integrated circuit 20 transitions to the sleep mode M1. On the other hand, when the uplink signal is received without the start of the power supply to the power receiver 24, the integrated circuit 20 performs a predetermined pairing process with the sensor controller 12. When the pairing is established as a result, the integrated circuit 20 transitions to the communication mode M3.

The integrated circuit 20 entering the sleep mode M1 does not receive the uplink signal and does not transmit the downlink signal, but monitors the state of the power supply to the power receiver 24 and the elapse of a predetermined period of time. While the power supply to the power receiver 24 continues, the integrated circuit 20 continues to operate in the sleep mode M1. When the power supply to the power receiver 24 ends or when the predetermined period of time has elapsed without power supply since the entry into the sleep mode M1, the integrated circuit 20 transitions to the discovery mode M2.

The integrated circuit 20 entering the communication mode M3 monitors the reception of the uplink signal by the receiver 22 and also monitors the start of the power supply to the power receiver 24. When the uplink signal is received, the integrated circuit 20 generates the downlink signal based on the received uplink signal and transmits the generated downlink signal at a timing indicated by the received uplink signal. On the other hand, when the uplink signal is not received at the timing when the uplink signal is supposed to be received and this unreceived state has continued a predetermined number of times, the integrated circuit 20 releases the pairing and transitions to the discovery mode M2. When the power supply to the power receiver 24 starts, the integrated circuit 20 releases the pairing and transitions to the sleep mode M1.

FIGS. 3 and 4 are flowcharts illustrating a processing flow of the integrated circuit 20. The operation of the integrated circuit 20 will be described in more detail with reference to FIGS. 3 and 4.

The integrated circuit 20, which has started processing, first enters the discovery mode M2 (S1). Next, the integrated circuit 20 determines whether or not power is being supplied to the power receiver 24 (S2). When the integrated circuit 20 determines that power is being supplied, the integrated circuit 20 enters the sleep mode M1 (S6).

Here, in the determination of S2, when, for example, the integrated circuit 20 detects that the active stylus 3 and the electronic device 2 have magnetically bonded in response to the magnetic sensor 28 detecting the magnetic field generated by the magnet 14 or 15 of the electronic device 2, the integrated circuit 20 may detect that the power supply to the power receiver 24 has started. Alternatively, the integrated circuit 20 may detect that the power supply to the power receiver 24 has started by detecting an increase in voltage inside the power receiver 24. Alternatively, when a signal indicating the start of the power supply is received from the electronic device 2, the integrated circuit 20 may detect that the power supply to the power receiver 24 has started. The signal indicating the start of the power supply may be transmitted through the communication between the power transmitter 13 and the power receiver 24 described above, or as part of the uplink signal from the sensor controller 12, or through short-range wireless communication such as Bluetooth (registered trademark).

When the integrated circuit 20 determines at S2 that there is no power supply, the integrated circuit 20 controls the receiver 22 so as to perform an operation of receiving the uplink signal (S3). When the uplink signal is received as a result, the integrated circuit 20 proceeds to S11 of FIG. 4 (S4). On the other hand, when no uplink signal has been received for a predetermined period of time, the integrated circuit 20 enters the sleep mode M1 (S5 and S6).

The integrated circuit 20 entering the sleep mode M1 stops the reception of the uplink signal by the receiver 22 (S7), thereby stopping the transmission of the downlink signal by the transmitter 23. When the transmission/reception schedule has already been acquired at S14 to be described later, the integrated circuit 20 can perform the stopping operation of S7 by invalidating the acquired transmission/reception schedule.

Next, the integrated circuit 20 determines whether or not power is being supplied to the power receiver 24 in a manner similar to S2 (S8). As a result, when the integrated circuit 20 determines that power is being supplied, the integrated circuit 20 repeats the determination process of S8. On the other hand, when the integrated circuit 20 determines that there is no power supply, the integrated circuit 20 determines whether or not the power supply to the power receiver 24 has ended (S9). As a result, when the integrated circuit 20 determines that the power supply to the power receiver 24 has ended, the integrated circuit 20 returns to S1 and enters the discovery mode M2. Note that the determination of S9 is the determination as to whether or not the power supply has ended. Therefore, when the power supply to the power receiver 24 has not started in the first place, the determination result of S9 is negative.

When the integrated circuit 20 obtains the negative determination result at S9, the integrated circuit 20 determines whether or not a predetermined period of time has elapsed since the entry into the sleep mode M1 (S10). As a result, when the integrated circuit 20 determines that the predetermined period of time has not elapsed, the integrated circuit 20 returns to S8 and repeats the processing. When the integrated circuit 20 determines that the predetermined period of time has elapsed, the integrated circuit 20 returns to S1 and enters the discovery mode M2.

Referring to FIG. 4, the integrated circuit 20, which has proceeded to S11, determines whether the current mode is the discovery mode M2 or the communication mode M3 (S11). As a result, when the integrated circuit 20 determines that the current mode is the discovery mode M2, the integrated circuit 20 further determines whether or not pairing with the sensor controller 12 has been established (S12). As a result, when the integrated circuit 20 determines that pairing has been established, the integrated circuit 20 enters the communication mode M3 (S13). When the integrated circuit 20 determines at S11 that the current mode is the communication mode M3, when the integrated circuit 20 determines at S12 that pairing has not been established, or when the integrated circuit 20 enters the communication mode M3 at S13, the integrated circuit 20 proceeds to S14 to continue the processing.

At S14, the integrated circuit 20 performs the operation corresponding to the uplink signal received at S3 of FIG. 3 or at S19 to be described later (S14). This operation includes the acquisition of the transmission/reception schedule and the generation of the downlink signal as described above.

Next, the integrated circuit 20 determines whether or not power is being supplied to the power receiver 24 in a manner similar to S2 (S15). As a result, when the integrated circuit 20 determines that power is being supplied, the integrated circuit 20 proceeds to S6 of FIG. 3 to enter the sleep mode M1. Accordingly, the reception of the uplink signal and the transmission of the downlink signal stop and pairing with the sensor controller 12 is also released.

On the other hand, when the integrated circuit 20 determines at S15 that there is no power supply, the integrated circuit 20 determines according to the transmission/reception schedule acquired at S14 whether or not a transmission timing of the downlink signal has arrived (S16) and whether or not a reception timing of the uplink signal has arrived (S17). The integrated circuit 20 repeats the processing of S15 to S17 until the uplink signal is received or until the uplink signal unreceived state has continued the predetermined number of times.

When the integrated circuit 20 determines at S16 that the transmission timing of the downlink signal has arrived, the integrated circuit 20 causes the transmitter 23 to transmit the downlink signal generated at S14 (S18). When the integrated circuit 20 determines at S17 that the reception timing of the uplink signal has arrived, the integrated circuit 20 controls the receiver 22 so as to perform the operation of receiving the uplink signal (S19). When the uplink signal is received as a result, the integrated circuit 20 proceeds to S11 (S20). On the other hand, when the uplink signal is not received, the integrated circuit 20 determines whether or not the number of consecutive times the uplink signal is not received has reached a predetermined number of times (S21).

When the integrated circuit 20 determines at S21 that the predetermined number of times has been reached, the integrated circuit 20 releases the pairing with the sensor controller 12 and proceeds to S1 of FIG. 3 to enter the discovery mode M2. On the other hand, when the integrated circuit 20 determines in S21 that the predetermined number of times has not been reached, the integrated circuit 20 returns to S15 and repeats the processing.

Next, FIG. 5 is a diagram illustrating each state of an individual active stylus 3 retained by the sensor controller 12. As illustrated in FIG. 5, for each active stylus 3, the sensor controller 12 retains one of the following states: an uplink signal transmission stop state M11, an undetected state M12, a pairing state M13, and a communication state M14. The undetected state M12 is a state in which the sensor controller 12 does not retain information regarding the active stylus 3. In the case of the other states, the sensor controller 12 retains the state of the active stylus 3 by retaining state information indicating the state of the active stylus 3.

The state of one active stylus 3 retained by the sensor controller 12 at first is the undetected state M12. When the sensor controller 12 newly receives the downlink signal from this active stylus 3 in the undetected state M12, the sensor controller 12 rewrites the state information of the active stylus 3 into the pairing state M13.

The sensor controller 12 performs a predetermined pairing operation with the active stylus 3 in the pairing state M13. When the pairing is established as a result, the sensor controller 12 rewrites the state information of the active stylus 3 into the communication state M14. Accordingly, the sensor controller 12 can derive the position and receive data regarding the active stylus 3. When the downlink signal is no longer received from the active stylus 3 in the communication state M14, the sensor controller 12 deletes the state information retained for this active stylus 3. Accordingly, the state of the active stylus 3 returns to the undetected state M12.

The sensor controller 12 also monitors the state of the power supply from the power transmitter 13 to the active stylus 3. As a result, when the sensor controller 12 detects that the power transmitter 13 is wirelessly supplying power to one active stylus 3, the sensor controller 12 acquires the pen ID of the active stylus 3 to which the power is being supplied, releases the pairing with the active stylus 3 if the sensor controller 12 is paired with the active stylus 3, and then rewrites the state information of the active stylus 3 into the uplink signal transmission stop state M11.

The sensor controller 12 does not transmit the uplink signal to the active stylus 3 for which the sensor controller 12 retains the uplink signal transmission stop state M11 and continues to monitor the state of the power supply from the power transmitter 13. When, as a result of this monitoring, the sensor controller 12 detects the end of the wireless power supply from the power transmitter 13 to the active stylus 3, the sensor controller 12 deletes the state information retained for this active stylus 3. Accordingly, the state of the active stylus 3 returns to the undetected state M12.

Here, the sensor controller 12 transmits the uplink signal and receives the downlink signal in units of frames. Specifically, a frame is divided into a plurality of time slots, and the uplink signal is transmitted in the time slot at the head of the frame. The second time slot from the head of the frame is reserved for receiving the downlink signal from the active stylus 3 in the undetected state M12. When the active stylus 3 entering the discovery mode M2 illustrated in FIG. 2 first receives the uplink signal from the unpaired sensor controller 12 at S4 of FIG. 3, the active stylus 3 uses this second time slot to transmit the downlink signal at S18. The third and subsequent timeslots are allocated to the active stylus 3 in the pairing state M13 or the communication state M14.

FIG. 6 is a flowchart illustrating a processing flow of the sensor controller 12. Hereinafter, the operation of the sensor controller 12 will be described in more detail with reference to FIG. 6.

First, the sensor controller 12 determines whether or not there is any active stylus 3 from which the downlink signal has been newly received (S30). The determination result of S30 is affirmative when the downlink signal has been received in the second time slot described above. When the sensor controller 12 obtains the affirmative determination result at S30, the sensor controller 12 rewrites the state information of the active stylus 3 that has transmitted the downlink signal into the pairing state M13 (S31). After that, the sensor controller 12 performs a process of establishing pairing with the active stylus 3 in the pairing state M13 by using the uplink and downlink signals.

Next, the sensor controller 12 performs the processing of S33 to S36 for each active stylus 3 whose state information is retained (S32). Specifically, the sensor controller 12 first determines whether or not pairing has been established with the active stylus 3 of interest (S33). This determination result is affirmative when, for example, the sensor controller 12 has received the pen ID from the active stylus 3 of interest. When the sensor controller 12 determines that pairing has been newly established, the sensor controller 12 rewrites the state information of the active stylus 3 of interest into the communication state M14 (S35). Accordingly, the sensor controller 12 can derive the position and receive data regarding the active stylus 3 of interest.

When the sensor controller 12 determines at S33 that pairing has not been newly established or when the processing of S35 has been completed, the sensor controller 12 determines whether or not the downlink signal from the active stylus 3 of interest has been unreceived (S34). This determination result is affirmative when the downlink signal is not received in the time slot where the downlink signal from the active stylus 3 of interest is supposed to be received at S44 to be described later. When the sensor controller 12 determines that the downlink signal has been unreceived, the sensor controller 12 deletes the state information retained for the active stylus 3 of interest (S36). Accordingly, the active stylus 3 of interest enters the undetected state M12.

When the sensor controller 12 determines at S34 that the downlink signal has not been unreceived, that is, the downlink signal has been received, or when the processing of S36 has been completed, the sensor controller 12 proceeds to the processing for the next active stylus 3. When the processing of S32 has been completed for all the active styluses 3 whose state information is retained, the sensor controller 12 determines whether or not the power transmitter 13 is in the state of wirelessly supplying power to the active stylus 3 (S37).

Here, in the determination of S37, when the sensor controller 12 detects that the active stylus 3 and the electronic device 2 have magnetically bonded in response to, for example, at least one of the magnetic sensors 16 and 17 detecting the magnetic field generated by the magnet 26 of the active stylus 3, the sensor controller 12 may detect that the power transmitter 13 has shifted to the state of wirelessly supplying power to the active stylus 3. Alternatively, the sensor controller 12 may detect that the power transmitter 13 has shifted to the state of wirelessly supplying power to the active stylus 3 by detecting, through communication with the power transmitter 13, the start of the wireless power supply from the power transmitter 13 to the active stylus 3. Alternatively, the sensor controller 12 may detect that the power transmitter 13 has shifted to the state of wirelessly supplying power to the active stylus 3 by detecting communication between the power transmitter 13 and the power receiver 24 of the active stylus 3 described above. When the sensor controller 12 receives a signal indicating the start of the power reception from the active stylus 3, the sensor controller 12 may detect that the power transmitter 13 has shifted to the state of wirelessly supplying power to the active stylus 3. The signal indicating the start of the power reception may be transmitted through communication between the power transmitter 13 and the power receiver 24, or as part of the downlink signal from the active stylus 3, or through short-range wireless communication such as Bluetooth (registered trademark).

When the sensor controller 12 determines at S37 that the power transmitter 13 is in the state of wirelessly supplying power to the active stylus 3, the sensor controller 12 acquires the pen ID of the active stylus 3 to which the power is being supplied (S38). This acquisition is preferably performed through the communication between the power transmitter 13 and the power receiver 24 described above or short-range wireless communication such as Bluetooth (registered trademark). When the active stylus 3 can receive the uplink signal and the sensor controller 12 can receive the downlink signal transmitted from the active stylus 3, the uplink signal and the downlink signal may be used to acquire the pen ID. The sensor controller 12, which has acquired the pen ID, rewrites the state information of the active stylus 3 indicated by the acquired pen ID into the uplink signal transmission stop state M11 (S39). Accordingly, this active stylus 3 is excluded from the destination of the uplink signal generated at S42 to be described later.

When the sensor controller 12 determines in S37 that the power transmitter 13 is not in the state of wirelessly supplying power to the active stylus 3 or when the processing of S39 has been completed, the sensor controller 12 determines whether or not the power supply from the power transmitter 13 has ended (S40). As a result, when the sensor controller 12 determines that the power supply has ended, the sensor controller 12 deletes the state information retained in association with the pen ID of the active stylus 3 to which power has been supplied (S41). Accordingly, the active stylus 3 to which power has been supplied enters the undetected state M12. As with the determination of S9 (see FIG. 3) described above, the determination of S40 is the determination as to whether or not the power supply has ended. Therefore, when the power supply from the power transmitter 13 has not started in the first place, the determination result of S40 is negative.

When the determination result is negative at S40 or when the processing of S41 has been completed, the sensor controller 12 generates the uplink signal (S42). There are at least three types of uplink signals generated at S42. The first uplink signal is generated to search for a new active stylus 3 and includes a local ID to be assigned to the new active stylus 3 and information indicating the time slot to be allocated to the new active stylus 3. A broadcast address that is received by any active stylus 3 is set as the destination of this uplink signal. The second uplink signal is generated when there is any active stylus 3 for which the pairing state M13 is retained, and includes a command indicating the operation required for pairing. A local ID assigned to the active stylus 3 being paired is set as the destination of this uplink signal. The third uplink signal is generated when there is any active stylus 3 for which the communication state M14 is retained and when a command needs to be transmitted to this active stylus 3. The third uplink signal includes the command to be transmitted. A local ID assigned to the active stylus 3 to which the command is to be transmitted is set as the destination of this uplink signal. The sensor controller 12 selects one of these types as appropriate and generates the selected uplink signal.

At S42, the sensor controller 12 excludes, from the destination of the uplink signal, (the local ID of) the active stylus 3 for which the uplink signal transmission stop state M11 is retained. In other words, the sensor controller 12 does not generate the uplink signal whose destination is (the local ID of) the active stylus 3 for which the uplink signal transmission stop state M11 is retained. This stops the transmission of the uplink signal to the active stylus 3 to which power is being wirelessly supplied.

After generating the uplink signal, the sensor controller 12 transmits the generated uplink signal (S43) and then receives the downlink signal at each time slot (S44). After that, the sensor controller 12 returns to S30 and continues the processing.

In this manner, in the wireless power supply system 1 according to the present embodiment, the transmission of the downlink signal from the active stylus 3 or the transmission of the uplink signal from the sensor controller 12 to the active stylus 3 stops in response to the start of the wireless power supply from the electronic device 2 to the active stylus 3. This configuration can suppress power consumption when the battery 25 of the active stylus 3 is being charged by receiving power wirelessly supplied from the electronic device 2.

In the wireless power supply system 1 according to the present embodiment, the active stylus 3 can be fixed to the electronic device 2 in the orientation in which the magnet 26 and the magnet 14 are attracted to each other and the magnetic member 27 and the magnet 15 are attracted to each other. Alternatively, the active stylus 3 can be fixed to the electronic device 2 in the orientation in which the magnet 26 and the magnet 15 are attracted to each other and the magnetic member 27 and the magnet 14 are attracted to each other. This configuration can provide the wireless power supply system 1 with a high degree of freedom in the orientation of the active stylus 3 when the active stylus 3 is fixed to the electronic device 2.

Although the preferred embodiment of the present disclosure has been described above, the present disclosure is by no means limited to the above-described embodiment. Needless to say, the present disclosure can be implemented in various modes without departing from the scope of the present disclosure.

FIG. 7 is a diagram illustrating a system configuration of the wireless power supply system 1 according to a modification of the embodiment described above. In the present modification, a distance D1 between the magnet 26 and the magnetic member 27 is different from a distance D2 between the magnet 14 and the magnet 15. More specifically, the distance D1 is longer than the distance D2. With this configuration, as illustrated in FIG. 7, while, for example, the magnet 26 is attracted to the magnet 14, a side surface of the magnetic member 27 can be positioned in the vicinity of the center of the magnet 15 when viewed in the pen axis direction. This similarly applies when the magnet 26 is attracted to the magnet 15. Therefore, according to the present modification, the attraction force to be generated by the magnetic force between the magnetic member 27 and the magnet 14 or 15 can increase compared to the case where the distance D1 and the distance D2 are equal to each other.

Although FIG. 7 illustrates an example where the distance D1 is longer than the distance D2, the distance D2 may be longer than the distance D1. With this configuration as well, while, for example, the magnet 26 is attracted to the magnet 14, the side surface of the magnetic member 27 can be positioned in the vicinity of the center of the magnet 15 when viewed in the pen axis direction. Accordingly, an effect similar to the effect described above can be provided.

In the present modification, as illustrated in FIG. 7, when viewed in the pen axis direction, a width W1 of the magnetic member 27 is smaller than a width W2 of each of the magnets 14 and 15. In other words, part of the magnetic member 27 according to the above-described embodiment in the pen axis direction is missing in the magnetic member 27 according to the present modification. More preferably, the width W1 is half of the width W2 (2×W1=W2). This configuration can further increase the attraction force to be generated by the magnetic force between the magnetic member 27 and the magnet 14 or 15.

What is claimed is:

1. An active stylus that transmits and receives signals to and from an electronic device, the active stylus comprising:
   a receiver which, in operation, receives an uplink signal transmitted from the electronic device;
   a transmitter which, in operation, transmits a downlink signal to the electronic device;
   a power receiver which, in operation, receives power wirelessly supplied from the electronic device; and
   an integrated circuit which, in operation, when the power is not being supplied to the power receiver, causes the transmitter to transmit the downlink signal in response to the receiver receiving the uplink signal, and stops transmission of the downlink signal by the transmitter in response to detecting that supply of the power to the power receiver has started,
   wherein, after the integrated circuit stops transmission of the downlink signal by the transmitter in response to detecting that supply of the power to the power receiver has started, the integrated circuit causes the receiver to receive the uplink signal in response to detecting that supply of the power to the power receiver has ended.

2. The active stylus according to claim 1, wherein, when the integrated circuit detects that the active stylus and the electronic device have magnetically bonded, the integrated circuit detects that supply of the power to the power receiver has started.

3. The active stylus according to claim 1, wherein the integrated circuit detects that supply of the power to the power receiver has started by detecting an increase in voltage inside the power receiver.

4. The active stylus according to claim 1, wherein, when a signal indicating that supply of the power to the power receiver has started is received from the electronic device, the integrated circuit detects that supply of the power to the power receiver has started.

5. The active stylus according to claim 1, wherein the integrated circuit stops the transmission of the downlink signal by the transmitter by stopping reception of the uplink signal by the receiver.

6. The active stylus according to claim 1, wherein the integrated circuit stops the transmission of the downlink signal by entering a sleep mode in which the uplink signal is not received and the downlink signal is not transmitted.

* * * * *